(12) United States Patent
Pille-Wolf et al.

(10) Patent No.: US 8,080,602 B2
(45) Date of Patent: Dec. 20, 2011

(54) RUBBER COMPOSITIONS WITH BUILDING TACK

(75) Inventors: Wolfgang Pille-Wolf, Tervuren (BE); Mark Stanley Pavlin, Kingsport, TN (US); Frederik Keijzer, Harde (NL); Ronnie Zeeman, Bussum (NL)

(73) Assignee: Arizona Chemical Company, LLC, Jacksonville, FL (US)

( * ) Notice: Subject to any disclaimer, the term of this patent is extended or adjusted under 35 U.S.C. 154(b) by 16 days.

(21) Appl. No.: 12/442,209

(22) PCT Filed: Sep. 18, 2007

(86) PCT No.: PCT/EP2007/008128
§ 371 (c)(1),
(2), (4) Date: Dec. 17, 2009

(87) PCT Pub. No.: WO2008/034591
PCT Pub. Date: Mar. 27, 2008

(65) Prior Publication Data
US 2010/0317781 A1 Dec. 16, 2010

(30) Foreign Application Priority Data
Sep. 20, 2006 (EP) .................................. 06019704

(51) Int. Cl.
*C09J 7/02* (2006.01)
(52) U.S. Cl. ........ 524/271; 524/270; 530/212; 530/215; 525/54.4
(58) Field of Classification Search .................. 524/271
See application file for complete search history.

(56) References Cited

U.S. PATENT DOCUMENTS 5,124,422 A * 6/1992 Rance et al. ................ 526/318.2
6,022,947 A * 2/2000 Frihart et al. ................ 530/212

FOREIGN PATENT DOCUMENTS

| EP | 0362727 A2 | 4/1990 |
|----|-----------|--------|
| EP | 0385033 A1 | 9/1990 |
| EP | 0563710 A1 | 10/1993 |
| EP | 0643117 A1 | 3/1995 |
| EP | 1514901 A1 | 3/2005 |
| JP | 04-189844 | 7/1992 |
| KR | 2001-0106735 A | 12/2001 |

* cited by examiner

*Primary Examiner* — Doris Lee

(57) ABSTRACT

The invention relates to a rubber composition comprising a natural or synthetic rubber or a mixture of such rubbers, a tackifier, and optionally further additives, wherein the tackifier is prepared from a rosin and an alkylphenol aldehyde resin of the resol type, which rubber composition has a good building tack and tack retention.

22 Claims, 1 Drawing Sheet

RUBBER COMPOSITIONS WITH BUILDING TACK

The invention relates to rubber compositions with building tack.

Building tack of the unvulcanised rubber is essential in multi ply rubber goods such as tyres. It means that surfaces of elastomers flow into each other upon contact so that an interphase is not visible anymore and products can be build up from rubber plies. The plied material behaves like one bulk product in which stress can be distributed homogenously. This phenomenon is also called autohesion and should not be confused with the term tack of the adhesives technology. There tack is a synonym for wetting of surfaces which are chemically different to the adhesive. In rubber technology this phenomenon is called stickiness, wetting of metal parts of mixing equipment. This is a feature which only is wanted to a certain degree to ensure friction and shear during compounding operations.

In the tyre industry tackifers are used to provide building tack to rubber compounds. Other than natural rubber, synthetic rubber does not have the sufficient building tack. Therefore resin must be added to increase tack. Building tack is an important prerequisite to enable tyre building from flat layered materials. Building tack provides the handling strength of green tyres until they are vulcanized. Typical known tackifier resins are tert.-octyl- and tert.-butylphenol novolaks. Another important feature is tack retention. Tyre segments are premanufactured and then stored. During the storage time the building tack should not change. With novolak resins a tack retention of 2 days is achievable, and with a special resin made from tert.-butylphenol and acetylene (Koresin®—BASF)), a tack retention of 8 days is possible. However, the Koresin® price is very high and its availability is limited.

Before the introduction of novolak resins, rosin was used as a tackifying resin. Rosin salts are preferably used as emulsifiers in the emulsion polymerization of styrene butadiene rubber because of the generation of building tack. A reaction product of phenol and rosin is known as an intermediate in the area of resins for printing inks.

An object of the present invention is therefore to provide rubber compositions or compounds with a good building tack and a good tack retention. Building tack and tack retention should be comparable or even better as for rubber compositions containing conventional tackifiers such as novolak resins based on tert.-butylphenol or tert.-octylphenol or Koresin®.

This object is achieved by a rubber composition as defined in present claim 1 and by the use of a rosin resol resin as tackifier as defined in present independent claim 12.

These and other objects and features of the invention will be apparent from the description, drawings, and claims which follow.

Further advantageous and/or preferred embodiments of the invention are subject-matter of the respective subclaims.

For the inventive rubber compositions the achieved tack is higher than the one produced with known tackifier resins, and tack retention is more pronounced than using reference resins such as Koresin®. The rosin resol resin used as tackifier is partially based on renewable resources and due to achieved high tack level less resin is needed in a rubber composition to achieve the same effect.

The inventive rubber compositions may be used for any part of a tyre, for example, side wall compounds, apex, inner liners, undertread cement. However, they are useful in general for a wide variety of industrial goods, such as rubber based products or goods, or (pressure sensitive) adhesives, hot melts. It should be noted that, of course, the inventive rubber compositions may be vulcanized, even when in this case building tack becomes irrelevant.

In the following the invention is disclosed in more detail with reference to examples and to drawings. However, the described specific forms or preferred embodiments are to be considered in all respects as illustrative and not restrictive, the scope of the invention being indicated by the appended claims rather than by the following description, and all changes which come within the meaning and range of equivalency of the claims are therefore intended to be imbraced therein.

Apart from natural rubbers (NR), suitable synthetic rubbers for use in the inventive rubber compositions are, for example, butadiene rubber (BR), styrene-butadiene rubber (SBR), halogenated isopren isobutylene rubber (XIIR) (commonly known as halogenated (e.g. chlorinated) butyl rubber), nitril rubber (NBR), hydrogenated nitril rubber (HNBR), EPDM and chloropren rubber (CR) or mixtures thereof. There are no specific restrictions with respect to the rubber type. Definitions for all acronyms and all other technical terms used here in connection with rubbers can be found in "Lexikon Kautschuktechnik" by Jochen Schnetger (Hüthig, 2004).

Suitable rosins for the preparation of the tackifier used in the inventive rubber compositions are, for example, gum rosin, tall oil rosin or wood rosin or mixtures thereof. There are no specific restrictions with respect to the rosin type.

Suitable alkylphenols for the preparation of the tackifier used in the inventive rubber compositions may have a linear (straight or non-branched) or branched alkyl residue with 1 to 18 carbon atoms, for example 1 to 10 carbon atoms or 1 to 8 carbon atoms or 1 to 6 carbon atoms or 1 to 4 carbon atoms. Specific examples for alkyl residues are methyl, ethyl, n-propyl, iso-propyl, n-butyl, iso-butyl, tert.-butyl, n-hexyl, n-octyl or n-nonyl groups. The position of the alkyl residue on the phenol ring may be ortho or para. It is possible to use mixtures of alkylphenols.

Specific examples for suitable alkylphenols are (para)-tert.-butylphenol, (para)-nonylphenol, (para)-octylphenol, (para)-tert.-octylphenol or mixtures thereof. The brackets indicate that the para-position is optionally.

Suitable aldehydes for the preparation of the tackifier used in the inventive rubber compositions are not limited to any particular type. For practical reasons the aldehyde has an alkyl residue with 1 to 8, e.g. 1 to 6, carbon atoms. Specific examples for alkyl residues are methyl, ethyl, n-propyl, iso-propyl, n-butyl, iso-butyl, text.-butyl, n-hexyl, n-octyl or n-nonyl groups. Formaldehyde may also be used in the form of paraformaldehyde or aqueous formalin/formaldehyde solutions or in the form of any compound generating formaldehyde for chemical reactions. It is possible to use mixtures of aldehydes.

The tackifier used in the inventive rubber compositions is, for example, prepared with a mole ratio of resol to rosin of from 2.0 to 6.0 or 2.2 to 5.6. A specific suitable mole ratio of resol to rosin is, for example, 3.93.

The resol for the tackifier used in the inventive rubber compositions is, for example, prepared with a mole ratio of aldeyde, e.g. formaldehyde, to alkylphenol, e.g. para-alkylphenol, of from 1.01 to 2.3 , e.g. 1.05 to 2.0, e.g. 1.05 to 1.22, e.g. 1.1 to 1.9, e.g. 1.1 to 1.8, e.g. 1.1 to 1.5. A specific suitable mole ratio of aldeyde, e.g. formaldehyde, to alkylphenol, e.g. para-alkylphenol, is, for example, 1.34 or 1.2 or 1.15.

Whereas the defined resol/rosin ratios and aldehyde/alkylphenol ratios, respectively, result in typical resins which are suitable as tackifiers in the inventive rubber compositions, there are further parameters which allow the selection of particularly suitable tackifiers. These are the acid number, the OH value and the softening point. In fact, these parameters result from the above defined ratios. Particularly suitable are resins with an acid number in the range of 70 to 120 mgKOH, an OH value in the range of 80 to 140 mgKOH (resulting in high polarity—the higher, the better) and a softening point in the range of 80 to 140° C. Generally, the upper limits are, but without limitation, preferable.

The tackifier may be used in the inventive rubber compositions, for example, in an amount of 0.1 to 10 phr (parts per hundred resin).

It should be noted that the resins used in the invention could be fully or partly esterified to reduce the softening points. Suitable are for example linear or branched alcohols with 1 to 18, e.g. 1 to 8, carbon atoms, which alcohols may be mono or polyhydric, e.g. dihydric, trihydric and tetrahydric.

EXAMPLES

Figure 1:
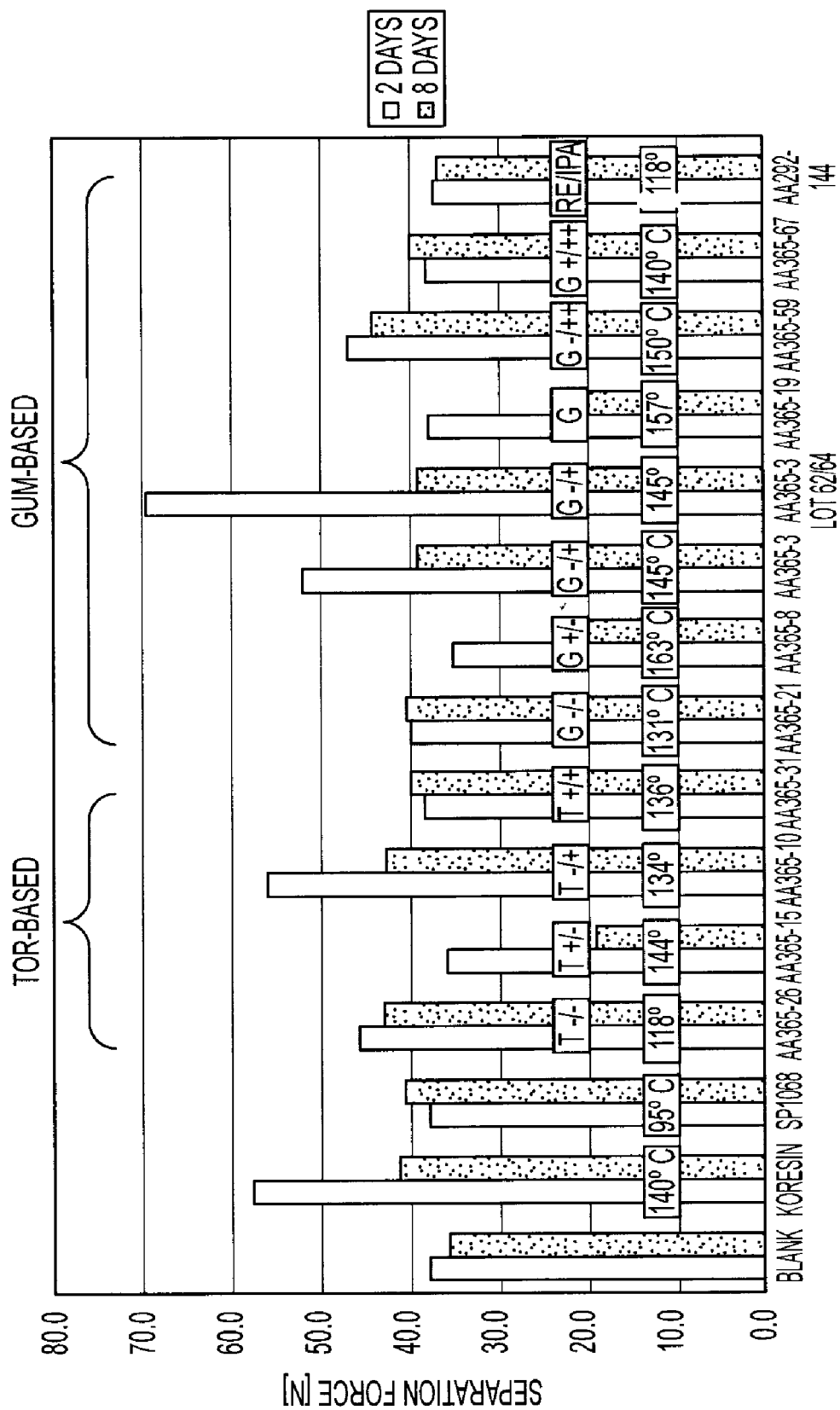
FIG. 1 shows 2 day and 8 day tack of sidewall rubber compounds measured as separation force; resins include 2 competitive commercially available resins: Koresin® (BASF) and SP1068® (Schenectady) and an isophthalic acid modified rosin ester (AA292-144), AA365-3 lot 62/64 is a reproduction made from 2 combined lab batches; top labels correspond to the position of the resin in the experimental design, mid labels show the resin softening point.

A series of resins have been synthesized according to standard laboratory conditions for lithographic ink resins (see below). The formulations were based on a given molar formaldehyde/phenol ratio (F/P) and on a given resol/rosin (Res/Ros) molar ratio. The molar weight of the resole was derived from the sum of molar weights of phenol and formaldehyde. As third factor the amount of PAN acids in the rosin was applied, in practise this meant that either tall oil rosin (TOR) or gum rosin (Gum) were used. Gum rosin represents the highest amount of PAN acid and TOR the lowest. The PAN acids are palustric, abietic and neoabietic acids, with conjugated double bonds reactive with formaldehyde and phenol, and act as polymerization chain stoppers. Also, for some resins, 1:1 mixtures of Gum and TOR are used to study the changes of the molecular weight distribution Moiré in detail. As starting points for the 3 factors F/P, Res/Ros and Gum/TOR, the ones for resins AA365-3 and AA365-8 were used (in parenthesis the symbols for the levels used in graphs):

| | | | |
|---|---|---|---|
| F/P | low (−): 1.34 | high (+): 1.81 | |
| Res/Ros | low (−): 2.36 | high (+): 3.93 | very high (++): 5.52 |
| PAN acids | low: TOR (T) | high: Gum (G) | |

Since the acid number is used to determine the equivalent weight (molecular weight) of rosin and the levels were not corrected for different acid numbers of Gum or TOR, the levels for the TOR based recipes are slightly deviating from those set for gum rosin.

Resin AA365-3 represents the mixture G−/+, and resin AA365-8 corresponds to G+/− (see Tab. 2)

The resins were synthesised according to the following lab procedure: Charging rosin into a reactor and melting it by increasing temperature to 180° C. Before adding the alkylphenol the temperature is reduced to 110° C. After adding alkylphenol under stirring, the catalyst MgO (any other alkaline catalyst can be used) and finally paraformaldehyde is added. For the condensation to the resole the reaction mixture is kept at between 110 and 120° C. for 2 hours. Thereafter, the temperature is raised to 220° C. at a rate of 30° C./h. At top temperature the mixture is stirred for another 2.5 hours. The mixture is discharged and cooled.

From each resin the softening point, acid number and OH value were determined. The recipes and data are shown in Tab. 2.

For tack measurements, the resins were incorporated into a typical sidewall rubber composition (Tab. 1). As reference there is a blank compound in which the resin portion was omitted and 2 competitive resins: Koresin® of BASF and SP1068® of Schenectady.

TABLE 1

| Sidewall composition | |
|---|---|
| Component | phr |
| BR - Buna ® CB24 Lanxess | 60.0 |
| NR - RSS1 | 40.0 |
| Carbon Black N 550 | 45.0 |
| TDAE - Aromatic oil | 5.0 |
| Resin - Tackifier | 4.0 |
| 6PPD - Antioxidant | 2.5 |
| TMQ - Anitoxidant | 1.5 |
| Paraffin wax | 1.0 |
| Stearic acid | 2.0 |
| Zinc oxide | 3.0 |
| CBS - Vulcanisation agent | 1.5 |
| CTP - Vulcanisation agent | 0.2 |
| Sulfur | 1.0 |

Mixing Procedure:

Masterbatch in 1.5 l (internal mixer (GK 1.5E)) pre-temperature 40° C., winding speed 40 rpm
1. step: BR and NR—2 minutes
2. step: added 75% of total Carbon Black, 6PPD, TMQ, ZnO, paraffin wax—2 minutes
3. step: added aromatic oil, 25% of Carbon Black—2 minutes Individual batches per resin in 200 ml internal mixer (Haake Rheomix 3000) pre-temperature 140° C., winding speed 50 rpm
4. step: added tackifer resin—5 minutes Productive step on open mill, pre-temperature 50° C., winding speed 10 and 20 rpm
5. step: added stearic acid, CBS, CTP, sulfur—7 minutes Mooney viscosity of the batches were measured according to DIN 53523 at 100° C.

Tack was measured after 2 and 8 days of storage of compound at 25° C., 50% rel. humidity with dust covers. The unvulcanised rubber sheets were 2 mm thick and sufficiently wide to allow the use of the Hock Tack Tester device (patented apparatus, see U.S. Pat. No. 5,753,822 and DE 196 124 10, respectively). The compound surface is covered with a non-stick film with an open whole of a diameter of 10 mm which allows the contact between 2 rubber sheets. The specimens were compressed on each other with a force of 50 N for 20 seconds at 23° C. The separation force was determined with a pulling speed of 150 mm/min.

For eventual testing of the mechanical properties of the rubber compounds, 2 mm films can be vulcanised in a hot press at 160° C. for 14 min ($T_{90}$+1 min/mm).

The results are presented in Tab. 2 for those resins which were used for tack measurements. The resins reflect an $2^3$ experimental design with 2 additional resins at very high levels of Res/Ros (G−/++ and G+/++).

TABLE 2

Resin composition, physical properties, tack performance after 2 days and 8 days (2 d, 8 d) and Mooney viscosity of corresponding sidewall rubber compounds.

|  |  | Blank | Koresin | SP1068 | #365-3 G−/+ | #365-62 G−/+r | #365-64 G−/+r | #365-10 T−/+ | #365-8 G+/− |
|---|---|---|---|---|---|---|---|---|---|
| F/P |  |  |  |  | 1.34 | 1.34 | 1.34 | 1.34 | 1.81 |
| Res/Ros |  |  |  |  | 3.93 | 3.93 | 3.93 | 3.82 | 2.36 |
| GUM | % w |  |  |  | 42.2 | 42.2 | 42.2 |  | 58.1 |
| TOR | % w |  |  |  |  |  |  | 42.2 |  |
| Nonylph. | % w |  |  |  | 47.7 | 47.7 | 47.7 | 47.7 | 32.6 |
| Formald. | % w |  |  |  | 9.5 | 9.5 | 9.5 | 9.5 | 8.8 |
| MgO | % w |  |  |  | 0.3 | 0.3 | 0.3 | 0.3 | 0.5 |
| SP | °C. |  | 141.7 | 95 | 145.7 | 144.9 | 144.6 | 133.8 | 163.5 |
| AN | mgKOH |  | 44.1 | 33 | 85.2 | 84.4 | 84.6 | 84 | 90.1 |
| Ohv | mgKOH |  | 197.6 |  | 123.7 | 112.1 | 112.9 | 118.2 | 62.7 |
| AN + Ohv | mgKOH |  | 241.7 |  | 208.9 | 196.5 | 197.5 | 202.2 | 152.8 |
| CP | °C. |  | <30 |  | <30 | <20 | <20 | <30 | 71 |
| Visc. | mPAs |  | 3.69 |  | 21.5 | 20.9 | 20.0 | 3.79 | 327 |
| Mn | D |  | 1173 |  | 1093 | 1070 | 1065 | 1043 | 892 |
| Mw | D |  | 2015 |  | 2564 | 3121 | 3156 | 3189 | 2086 |
| Tack 2 d | N | 37.8 | 57.8 | 38.0 | 51.8 | 69.6 | 69.6 | 56.0 | 34.9 |
| Tack 8 d | N | 35.7 | 41.2 | 40.5 | 39.3 | 39.2 | 39.2 | 42.7 | 22.5 |
| Mooney | ML(1 + 4) | 45.9 | 42.48 | 43.62 | 47.2 | 46.5 | 46.5 | 51.08 | 52.9 |

|  |  | #365-15 T+/− | #365-19 G+/+ | #365-31 T+/+ | #365-21 G−/− | #365-26 T−/− | #365-59 G−/++ | #365-67 G+/++ |
|---|---|---|---|---|---|---|---|---|
| F/P |  | 1.81 | 1.81 | 1.81 | 1.34 | 1.34 | 1.34 | 1.81 |
| Res/Ros |  | 2.29 | 3.93 | 3.82 | 2.36 | 2.29 | 5.52 | 5.47 |
| GUM | % w |  | 55.2 |  | 45.6 |  | 34.4 | 37.8 |
| TOR | % w | 58.1 |  | 55.2 |  | 45.6 |  |  |
| Nonylph. | % w | 32.6 | 37.2 | 37.2 | 42.6 | 42.6 | 54.3 | 48.5 |
| Formald. | % w | 8.8 | 7.4 | 7.4 | 11.5 | 11.5 | 10.9 | 13.4 |
| MgO | % w | 0.5 | 0.2 | 0.2 | 0.3 | 0.3 | 0.4 | 0.3 |
| SP | °C. | 144 | 156.9 | 135.7 | 131.4 | 118.8 | 150.5 | 140.9 |
| AN | mgKOH | 94 | 82.5 | 83.1 | 94.6 | 100.6 | 75.7 | 80.2 |
| Ohv | mgKOH | 63.7 | 97.2 | 101.2 | 87 | 82.5 | 135.1 | 124.1 |
| AN + Ohv | mgKOH | 157.7 | 179.7 | 184.3 | 181.6 | 183.1 | 210.8 | 204.3 |
| CP | °C. | <30 | 44 | <20 | <20 | <20 | <20 | <20 |
| Visc. | mPAs | 16.1 | 244 | 6.9 | 2.96 | 0.95 | 25.6 | 21.5 |
| Mn | D | 839 | 1160 | 1006 | 733 | 738 | 1377 | 1206 |
| Mw | D | 2700 | 2883 | 3227 | 1488 | 1732 | 4321 | 2894 |
| Tack 2 d | N | 35.8 | 37.9 | 38.4 | 40.0 | 45.8 | 46.9 | 38.2 |
| Tack 8 d | N | 19.1 | 21 | 40.2 | 40.5 | 43.1 | 44.1 | 39.7 |
| Mooney | ML(1 + 4) | 54.2 | 55.2 | 51.9 | 49.58 | 50.92 | 50.9 | 47.82 |

F/P = formaldehyde/phenol ratio,
Res/Ros = resin/rosin ratio,
G = Gum = gum rosin,
T = TOR = tall oil rosin,
SP = softening point,
AN = acid number,
Ohv = OH value,
CP = cloud point,
Visc. = viscosity,
Mn = number-average molecular weight,
Mw = weight-average molecular weight
In line 2, for example, G−/+ means Gum (gum rosin) with low F/P ratio (−) and high Res/Ros ratio (+), Exemplary meanings of the relative terms "low" and "high" are given above (it should be noted that this is only for understanding the experimental design).

The tack performance was measured from after 2 days and 8 days of storage in standardized climate. The tack results are graphically presented in FIG. 1.

A particular good resin is AA365-3, but also resins AA365-10, AA365-26 and AA365-59 show good results. (Note: In Tab. 2 in the resin number the "AA" is replaced by "#"). Resin AA365-3 and resin AA365-10 show a very high initial tack after 2 days but a relatively strong drop in tack after 8 days. Resin AA365-26 and resin AA365-59 show a relatively low initial tack after 2 days but a high tack retention even after 8 days. While both are important and valued, it should be noted that retention of tack at high level is more important than high initial tack. In general, the best results are obtained with gum rosin and para-nonyl- or para-octylphenol.

The phenol modified rosin resins used as tackifier in the inventive rubber compositions are physical mixtures of not reacted rosin (because of the unability to react) and linear phenolformaldehyde resin with terminal rosin groups.

Irrespectively of tack retention the preferable resin formulations are based on a low F/P ratio. For tack retention up to 8 days TOR formulation are preferred to Gum with the exception of the Gum based resin with a very high Res/Ros ratio. A preferable tack performance has a small difference between tack after 2 and 8 days and occurs at low F/P ratio, but both on a either a low or high Res/Ros ratio.

The invention claimed is:

1. A rubber composition comprising a natural or synthetic rubber or a mixture of such rubbers, a tackifier, and optionally further additives, characterized in that the tackifier is prepared from a rosin and an alkylphenol aldehyde resin of the resol type, further characterized in that the tackifier has an acid number of about 70 to 120.

2. The rubber composition according to claim 1, wherein the synthetic rubber is selected from the group consisting of butadiene rubber, styrene-butadiene rubber, halogenated isoprene isobutylene rubber, nitril rubber, hydrogenated nitril rubber, EPDM and chloropren rubber or mixtures thereof.

3. The rubber composition according to claim 1, wherein the rosin is selected from the group consisting of gum rosin, tall oil rosin or wood rosin or mixtures thereof.

4. The rubber composition according to claim 3, wherein the alkylphenol is selected from the group consisting of (para)-tert. -butylphenol, (para)-nonylphenol, (para)-octylphenol, (para)-tert. -octylphenol or mixtures thereof.

5. The rubber composition according to claim 3 wherein the aldehyde is selected from the group consisting of formaldehyde, acetaldehyde and propionic aldehyde.

6. The rubber composition according to claim 3, wherein the tackifier is prepared with a mole ratio of resol to rosin of from 2.0 to 6.0.

7. The rubber composition according to claim 6, wherein the tackifier is prepared with a mole ratio of resol to rosin of from 2.2 to 5.6.

8. The rubber composition according to claim 7, wherein the tackifier is prepared with a mole ratio of resol to rosin of 3.93.

9. The rubber composition according to any one of the preceding claims, wherein the resol is prepared with a mole ratio of (form)aldehyde to (para)-alkylphenol of from 1.01 to 2.3.

10. The rubber composition according to claim 9, wherein the resol is prepared with a mole ratio of (form)aldehyde to (para)alkylphenol of from 1:1 to 1.9.

11. The rubber composition according to claim 10, wherein the resol is prepared with a mole ratio of (form)aldehyde to (para)alkylphenol of 1.34.

12. A method of incorporating a tackifier into a sidewall rubber compound, comprising:
preparing a rubber compound mixture comprising mixing one or more rubber compounds comprising natural or synthetic rubbers or a mixture of such rubbers and one or more additives comprising carbon black, antioxidant, zinc oxide, paraffin wax and aromatic oil; and thereafter adding a tackifier to the rubber compound mixture, wherein the tackifier is prepared from a rosin resol resin, wherein the rosin resol resin is prepared from a rosin and an alklyphenol aldehyde resin of the resol type;
wherein the tackifier has an acid number of about 70 to 120.

13. The method of claim 12, wherein the synthetic rubber is selected from the group consisting of butadiene rubber, styrene-butadiene rubber, halogenated isopren isobutylene rubber, nitril rubber, hydrogenated nitril rubber, EPDM and chloropren rubber or mixtures thereof.

14. The method of to claim 13, wherein the rosin is selected from the group consisting of gum rosin, tall oil rosin or wood rosin or mixtures thereof.

15. The method of claim 14, wherein the alkylphenol is selected from the group consisting of (para)tert.-butylphenol, (para)-nonylphenol, (para)-octylphenol, (para)-tert.-octylphenol or mixtures thereof 16. The method of claim 15, wherein the aldehyde is selected from the group consisting of formaldehyde, acetaldehyde and propionic aldehyde.

17. The method of any of claims 12 to 16, wherein the rosin resol resin is prepared with a mole ratio of resol to rosin of from 2.0 to 6.0.

18. The method of claim 17, wherein the rosin resol resin is prepared with a mole ratio of resol to rosin of from 2.2 to 5.6.

19. The method of claim 18, wherein the rosin resol resin is prepared with a mole ratio of resol to rosin of 3.93.

20. The method of claim 19, wherein the resol is prepared with a mole ratio of (form)aldehyde to (para)-alkylphenol of from 1.01 to 2.3.

21. The method of claim 20, wherein the resol is prepared with a mole ratio of (form) aldehyde to (para)-alkylphenol of from 1.1 to 1.9.

22. The method of claim 21, wherein the with a mole ratio of (form) aldehyde to of 1.34.

* * * * *